R. O. VARGAS.
WHEEL FOR MOTOR VEHICLES AND THE LIKE.
APPLICATION FILED SEPT. 12, 1919.
1,382,943.
Patented June 28, 1921.
2 SHEETS—SHEET 1.
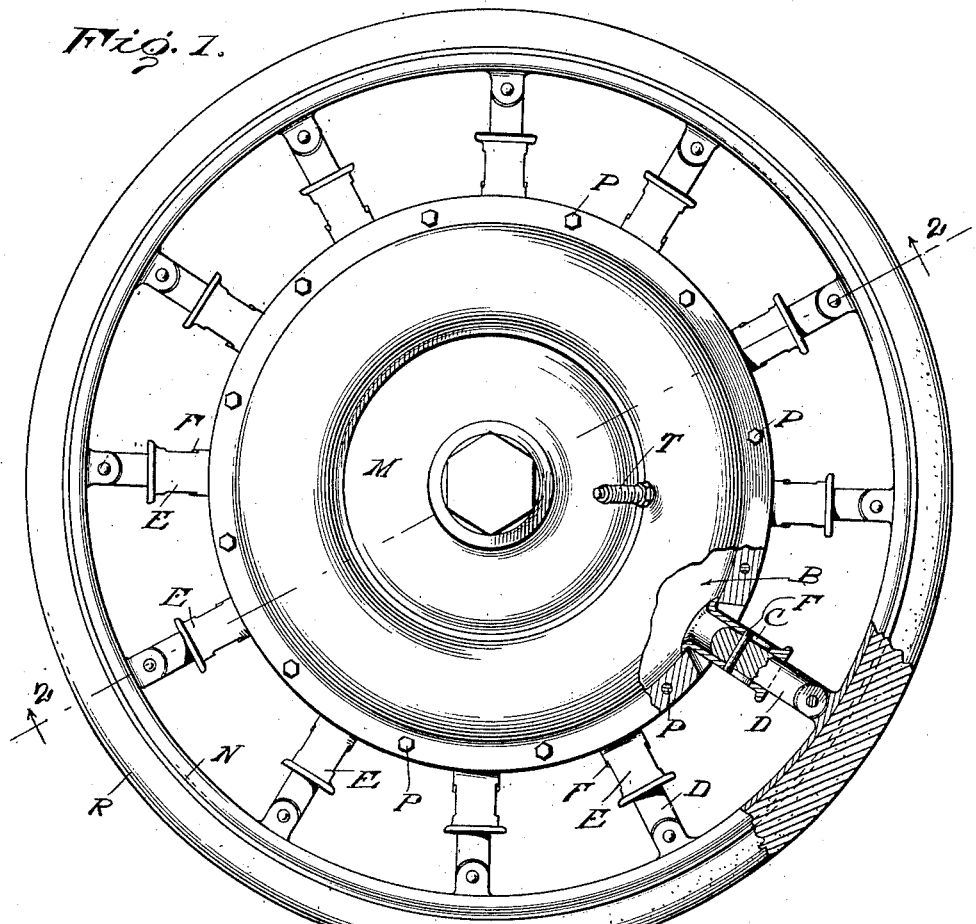
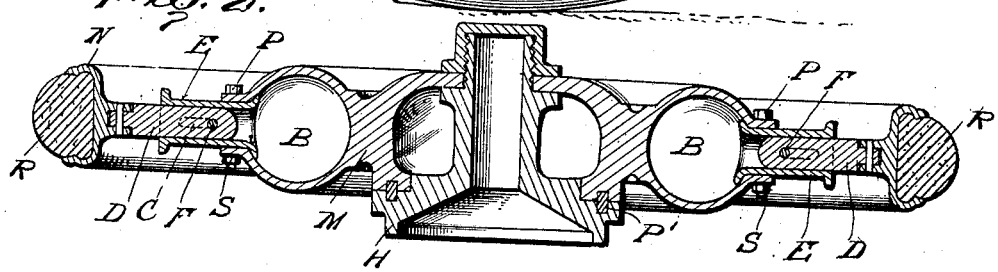
R. O. Vargas, INVENTOR.
BY 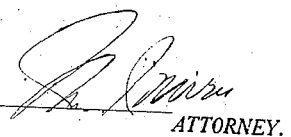
ATTORNEY.

R. O. VARGAS.
WHEEL FOR MOTOR VEHICLES AND THE LIKE.
APPLICATION FILED SEPT. 12, 1919.

1,382,943.

Patented June 28, 1921
2 SHEETS—SHEET 2.

Inventor.
R. O. Vargas.

by

Atty.

UNITED STATES PATENT OFFICE.

RAMÓN OBREGÓN VARGAS, OF TORRELAVEGA, SPAIN.

WHEEL FOR MOTOR-VEHICLES AND THE LIKE.

1,382,943.            Specification of Letters Patent.     Patented June 28, 1921.

Application filed September 12, 1919. Serial No. 323,334.

*To all whom it may concern:*

Be it known that I, RAMÓN OBREGÓN VARGAS, subject of the King of Spain, residing at Torrelavega, in the county of Santander and State of Spain, have invented certain new and useful Improvements in Wheels for Motor-Vehicles and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The system of wheel to which this invention relates, has for its object certain improvements in motor car wheels as hereto used, involving such advantages that render them far more practical in use.

The extensive development of motor vehicles nowadays, not only for private use but for business and commercial purposes also, requires that the provision of suitable wheels should be carefully considered, more especially as regards the pneumatic tires, inasmuch as the existing ones have deficiencies that render their use hardly practical, not only because they are liable to damage and deterioration, therefore giving rise to breakdowns and accidents, but also because of their costly upkeep and replacement.

One of the chief disadvantages of the pneumatic tires now in use, is their constant wear and tear owing to detrition and to sudden contact with materials lying on the road surface, such as small sharp-edged stones, bits of broken glass and the like, which produce punctures and ripping that cannot be readily repaired. By means of my improved device, all the disadvantages aforementioned are done away with, since the tire is not subject to wear and tear through friction, without however impairing the smooth motion of the vehicle.

In the accompanying drawings:

Figure 1 is a side view showing a wheel constructed in accordance with my invention, with certain parts broken away so as to illustrate the arrangement of the spokes.

Fig. 2 is a cross section through the wheel hub.

Figure 4:
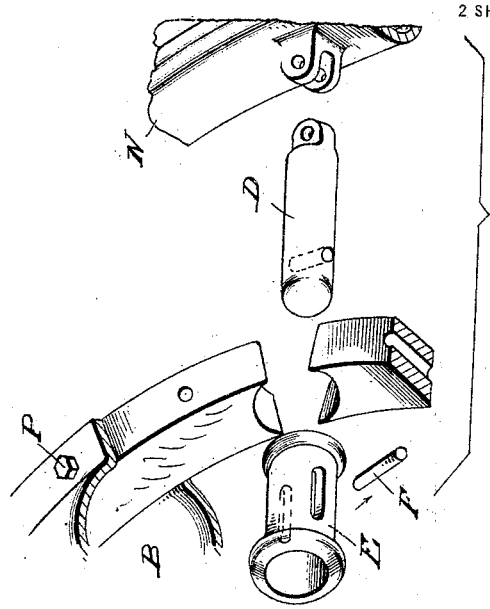
Fig. 4 is a disassembled perspective view of the parts of a spoke.
Figure 3:
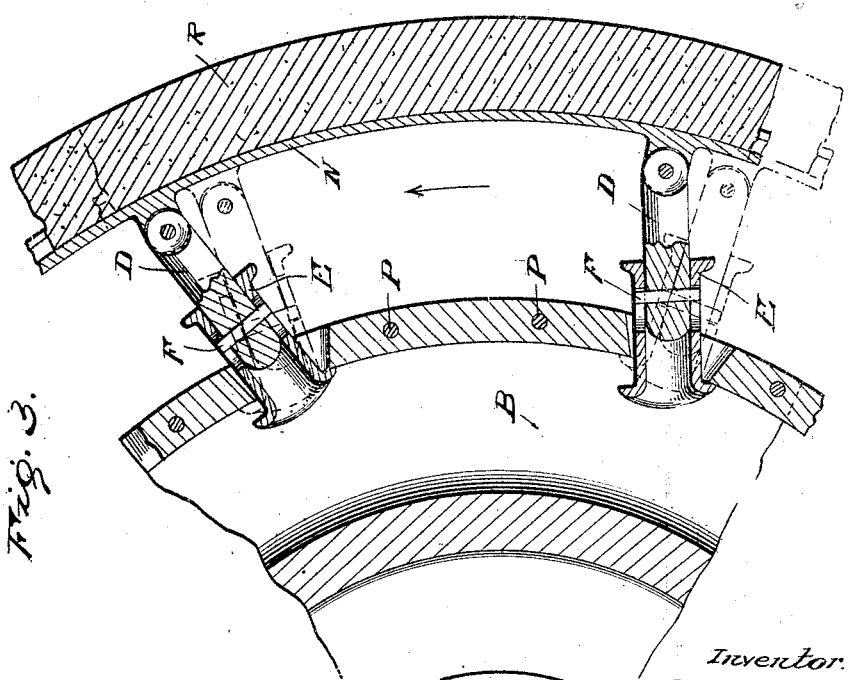
Fig. 3 is a detail sectional view showing the movement of one of the spokes.

As shown, the wheel is composed of a sheet iron disk M, having an annular recess in the edge thereof between the concave walls of which is snugly fitted the pneumatic tire which will be described farther on. The said disk has a plurality of oval shaped openings, of which there are twelve in the illustrated example, wherein are fitted the wheel spokes, these latter being partly tubular throughout their circumference.

Into the space or recess B formed by the concave walls of the sheet iron disk is fitted, as before stated, a pneumatic rubber tire having an outer lining or cover, made of canvas or other suitable flexible material, the tire being provided with a valve T for its inflation.

Once the tire has been fitted into the disk M it is rigidly secured in place by means of bolts P and nuts S. The rigid connection of the two disk plates is further increased by the fact of their being inclosed between the hub and the nut, which latter, once tightly screwed on, firmly secures the said plates so as to avoid the slightest displacement thereof. In addition to this fastening means, and in order to further steadying the attachment between the parts which the wheel is made of, I employ a member H provided with three screw-threaded nipples P' that are fitted into holes made for the purpose in the inner section of disk M, so as to avoid all possible loosening of the disk plates which are securely attached between member H and the hub nuts.

The wheel rim N, is also of iron plate, and carries on its outer surface a solid rubber tire R which is removably fastened thereto for substitution or repairs.

On the inner part of the wheel rim are fitted and secured by means of bolts F, the pivoted steel spokes D, which are in their turn inserted, up to a certain distance, in other outer spokes E, made also of steel. These latter spokes are formed with two channels or grooves suited to the diameter where the threaded stud bolt C carried by each of the spokes D acts, so as to avoid their displacement in the event of the pneumatic tire getting damaged. On the inner part of the wheel is fitted a grooved sheet iron plate that bears on the inflated tire when the wheel is at work, and in order to avoid the tire getting worn or deteriorated through friction, the said grooved plate can be lined with fabric rubber or some similar material.

The part of the tire where the said grooved plate bears, can also be reinforced by means of coatings or layers of canvas, rubber, fabric or other suitable material.

From the foregoing description, it will be readily understood that the operation of my improved wheel arrangement is an exceedingly simple and reliable one.

Once the wheels are mounted on the motor car or other vehicle, and that the weight of the latter commences to gravitate on their axles, the spokes that sustain the load will tend to drive farther into the space formed by the two concave sections of the disk, therefore exerting a bearing pressure on the tire, which will offer the necessary resiliency and elasticity, thus fully answering the same purposes as the outer pneumatic tire, without any of its disadvantages.

The felly N of the wheel can be fitted with a rim of any suitable material, such as iron, wood, solid rubber, etc.

The openings provided for tubes E are enlarged at their outer extremities as shown, so as to allow these a certain play in the direction of the springing of the wheel.

The arrangement of the hub may also be such as to render it easily fitted in place, according to the class of vehicle to which it may be applied.

Having now described and ascertained the nature of my said invention and the manner of carrying it into practice, I hereby declare that the subject matter in respect of which I apply for Letters Patent is set out in the following claims:

1. A resilient wheel comprising a hub having a recess adapted to receive a pneumatic tube, the periphery of said hub being formed with a series of elongated openings which are larger at their outer extremities, sleeves formed with slots movably mounted in said openings and provided with annular flanges for limiting the movement therein, a rim, spokes pivoted thereto and extending within the sleeves, pins carried by the spokes adapted to register with the slots and limit the movement of the spokes in the sleeves, and a tire mounted on the rim.

2. A resilient wheel comprising a hub provided in its periphery with a plurality of outwardly flared oval-shaped openings, a rim, telescopic spokes pivoted to the rim and extending through the flared openings in the hub and having flanges on their inner ends to hold same in said hub, and cushion means carried by the hub against which the flanged ends of the telescopic spokes bear.

3. A resilient wheel comprising a hub, provided in its periphery with a plurality of circumferentially elongated outwardly flared openings, a rim, telescopic spokes pivoted to the rim and extending through the flared openings in the hub and having flanges on their inner ends to hold same in said hub, and cushion means carried by the hub against which the flanged ends of the telescopic spokes bear.

In testimony whereof I have signed my name to this specification in the presence of two subscribing witnesses.

RAMÓN OBREGÓN VARGAS.

Witnesses:
M. MARTINEZ GÓMES,
MANUEL GONZALEZ CÁNAGO.